United States Patent [19]
Chajima et al.

[11] Patent Number: 5,178,480
[45] Date of Patent: Jan. 12, 1993

[54] FRICTION CLAMPING APPARATUS

[75] Inventors: Jyunichi Chajima; Toshio Nakayama, both of Hiroshima, Japan

[73] Assignee: The Japan Steel Works Ltd., Tokyo, Japan

[21] Appl. No.: 704,243

[22] Filed: May 22, 1991

[30] Foreign Application Priority Data

May 25, 1990 [JP] Japan .................. 2-134039

[51] Int. Cl.⁵ .............................................. F16B 1/00
[52] U.S. Cl. ........................................ 403/15; 403/37
[58] Field of Search ............... 403/15, 36, 31, 5, 37, 403/34

[56] References Cited

U.S. PATENT DOCUMENTS

| | | | |
|---|---|---|---|
| 3,917,422 | 11/1975 | Betzler | 403/15 |
| 4,425,050 | 1/1984 | Durand | 403/15 |
| 4,552,916 | 7/1985 | Wührer | 403/15 X |
| 4,800,644 | 1/1989 | Muellenberg | 403/15 X |
| 4,979,842 | 12/1990 | Miller et al. | 403/15 |

Primary Examiner—Peter M. Cuomo
Attorney, Agent, or Firm—Sughrue, Mion, Zinn, Macpeak & Seas

[57] ABSTRACT

A friction clamping apparatus includes: a rod; a plurality of friction clamping units serially connected in the axial direction of the rod, each of the friction clamping units including a radially elastically transformable sleeve and a ram into which the sleeve is fittingly inserted, the rod being fittingly inserted through the respective sleeves of the friction clamping units; and restraint pressure chambers defined by an inner circumferential surfaces of the ram and outer circumferential surfaces of the sleeve respectively, so that an oil pressure is made to act upon the restraint pressure chambers to restrain the rod with the sleeves or the oil pressure is made so as not to act upon the restraint pressure chambers to release the rod from the sleeves.

5 Claims, 2 Drawing Sheets

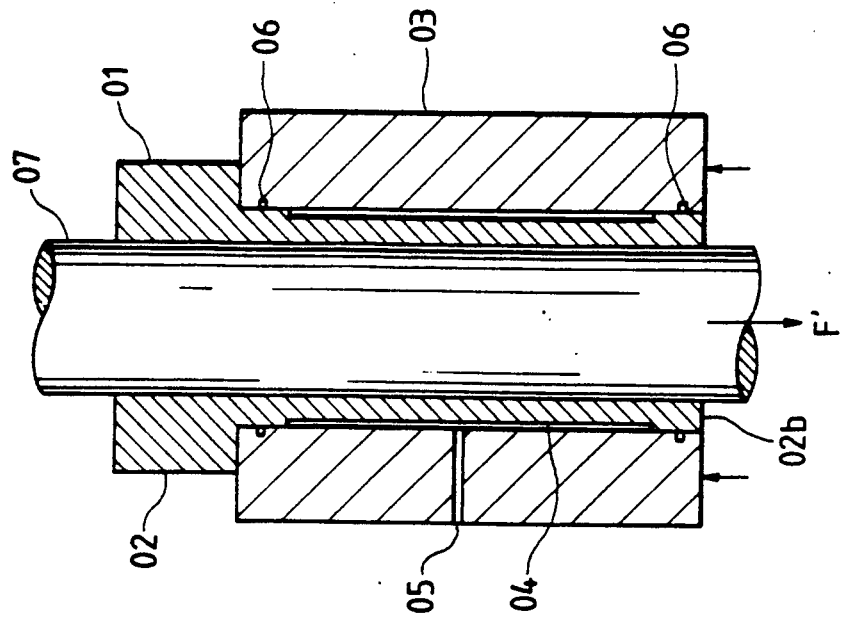
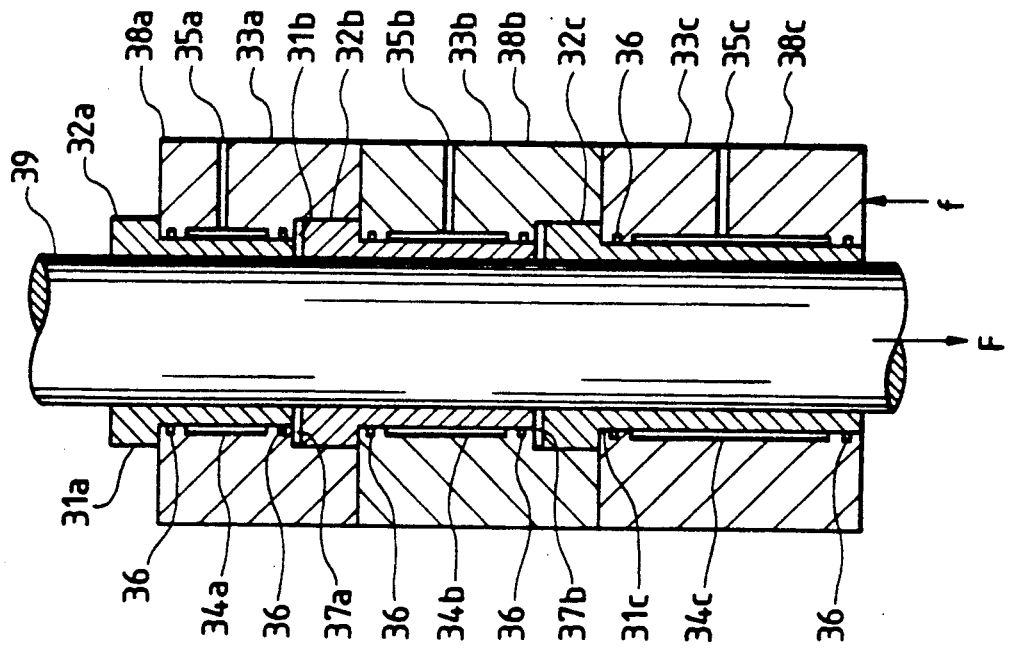

5,178,480

FRICTION CLAMPING APPARATUS

BACKGROUND OF THE INVENTION

The present invention relates to a friction clamping apparatus.

As a conventional friction clamping apparatus, known is that shown in FIG. 4, in which a sleeve 01 having a collar portion 02 is fittingly inserted through an outer cylinder 03 so that the collar portion 02 is engaged with one end surface of the outer cylinder 03 to thereby form a restraint pressure chamber between the outer cylinder 03 and the outer circumferential surface of a small diameter portion of the sleeve 01, and a shaft 07 is slidably fittingly inserted through the hole of the sleeve 01. A pressurized fluid is supplied into the restraint pressure chamber through a leading hole 05 so as to reduce the diameter of the sleeve 01 to urge the sleeve 01 against the outer circumferential surface of the shaft 07 to thereby produce a friction force between the sleeve 01 and the shaft 07 to restrain the shaft.

In such a conventional apparatus, the sleeve receives a reaction force against a force F, given to the shaft at the time of restraint concentrically in the vicinity of the collar portion of the sleeve, so that it is necessary to make the sleeve thick enough to have strength against the reaction force. As a result, not only has there been a problem that the apparatus becomes large in size, but, in the worst case, there has been a problem that it is difficult to perform processing and assembling from the standpoint of accuracy in processing and assembling and also difficult to perform maintenance and inspection. There has been a further problem that the pressure for a pressurized fluid required for shrinking a sleeve becomes large.

SUMMARY OF THE INVENTION

It is therefore an object of the present invention to solve the foregoing problems in the prior art.

It is another object of the present invention to provide a friction clamping apparatus in which the thickness of the sleeve can be made thinner than a conventional one, and the pressure for a pressurized fluid required for shrinking the sleeve can be set to a lower value.

In order to attain the above objects, according to an aspect of the present invention, the friction clamping apparatus comprises: a rod; a plurality of friction clamping units serially connected in the axial direction of the rod, each of the friction clamping units including a radially elastically transformable sleeve and a ram into which the sleeve is fittingly inserted, the rod being fittingly inserted through the respective sleeves of the friction clamping units; and restraint pressure chambers defined by an inner circumference of the outer cylinder and an outer circumference of the sleeve respectively, so that an oil pressure is made to act upon the restraint pressure chambers to restrain the rod with the sleeves and the oil pressure is made so as not to act upon the restraint pressure chambers to release the rod from the sleeves.

According to another aspect of the present invention, the friction clamping apparatus comprises: a plurality of clamping units, each of the clamping units including a radially elastically transformable sleeve provided with a collar portion and outer cylinder, the sleeve being fittingly inserted into the outer cylinder so that the color portion engages air-tightly with one end surface of the cylinder to thereby define a restraint pressure chamber by an inner circumference of the outer cylinder and an outer circumference of the sleeve, the clamping units being different in axial length from each other; and a rod slidably fittingly inserted through the respective sleeves of the plurality of clamping units.

According to a further aspect of the present invention, the friction clamping molding apparatus comprises: a rod; a friction clamping portion including a series of a plurality of sleeves, a series of a plurality of rams, one of the rams being fittingly inserted into an adjacent one of the rams so that the rams are connected in series one by one, the rod being fittingly inserted through the series of sleeves, the series of sleeves being fittingly inserted into the series of rams respectively so as to form oil chambers between the sleeve and the rams respectively so that an oil pressure is made to act upon the oil chambers to thereby restrain the rod and the sleeves with each other; and a clamping portion including a housing, the rod being fittingly inserted through the housing, the outermost one of the rams being fittingly inserted into the housing so as to form an oil clamping chamber so that an oil pressure is made to act upon the oil clamping chamber to thereby generate a clamping force.

In the first and second aspects of the present invention, the oil chambers of the friction clamping portion are operated by oil pressure through oil paths to thereby transform the sleeves elastically so as to generate a friction force between the rod and the sleeves so that the rod and the sleeves are restrained with each other. In such a state, in the case where the oil chamber and the oil path are formed between the lower end portion of the rams of the friction clamping portion and the housing, the oil chamber is operated by oil pressure through the oil path so that it is possible to produce a clamping force. On the other hand, if the oil pressure given to the oil chambers is released through the oil paths, it is possible to release the state of restraint with the rod.

In the third aspect of the present invention, in the state where a pressurized fluid has not been supplied to the restraint pressure for each clamping unit, the sleeves fittingly inserted into the outer cylinders can slide along the rod, so that respective clamping units are guided by the rod slidably in the axial direction.

On the other hand, if a pressurized fluid is supplied to the restraint chambers of the respective clamping units, the sleeves are shrunk in the radial direction by the pressure of the pressurized fluid, so that the inner circumferential surfaces of the respective sleeves are pressed against the outer circumferential surface of the rod respectively to thereby produce a friction force and the respective sleeves and the rod are restrained to be integrated with each other. At the time of this restraint, the reaction force against the force given to the rod is dispersed to the respective clamping units. As a result, in the respective clamping units, their sleeves are expanded in the axial direction and at the same time their outer cylinders are shrunk in the axial direction so as to be transformed.

BRIEF DESCRIPTION OF THE DRAWINGS

Other features and advantages of the present invention will be apparent from the following description taken in connection with the accompanying drawings, wherein:

FIG. 3 is a sectional view illustrating a main part of a further embodiment of the friction clamping apparatus according to the present invention; and FIG. 4 is a sectional view illustrating a main part of a conventional friction clamping apparatus.

DETAILED DESCRIPTION OF THE PREFERRED EMBODIMENTS

Preferred embodiments of the present invention will be described with reference to the drawings.

Figure 1:
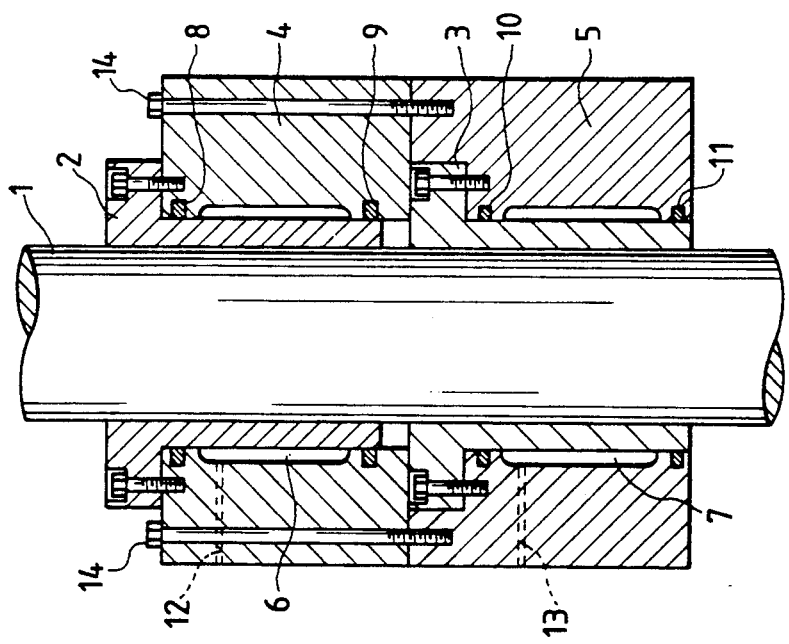
FIG. 1 is a sectional view illustrating a main part of an embodiment of the friction clamping apparatus according to the present invention.

FIG. 1 shows a first embodiment of the present invention.

In FIG. 1, a friction clamping portion provided with a cylindrical rod 1 fittingly inserted through sleeves 2 and 3 can slide in the axial direction if an external force is not given thereto. The sleeves 2 and 3 are fittingly inserted through rams 4 and 5 respectively, and the rams 4 and 5 are connected to each other by connection members 14 such as bolts.

The rams 4 and 5 have large-diameter portions formed on the inside thereof respectively so as to form annular oil chambers 6 and 7 between the sleeves 2 and 3 and the rams 4 and 5 respectively. The axially upper and lower end portions of the oil chambers 6 and 7 are sealed by seal members 8 through 11 respectively. Oil pressure can be supplied to or released from the oil chambers 6 and 7 through oil paths 12 and 13 respectively.

Next the operation of this embodiment will be described. When oil pressure is applied to the oil chambers 6 and 7 of the friction clamping portion through the oil paths 12 and 13, the sleeves 2 and 3 are transformed elastically to thereby produce a friction force between the rod 1 and each of the sleeves 2 and 3, so that the sleeves 2 and 3 are restrained with the rod 1. In such a state of fixation, when another external force is applied to the sleeves 2 and 3 or the rams 4 and 5, it is possible to hold the external force in the rod 1, so that this mechanism may be used as a clamping apparatus. On the other hand, if the oil pressure having been given to the oil chambers 6 and 7 is released through the oil paths 12 and 13, the state of restraint with the rod 1 can be released. When the state of restraint of the sleeves 2 and 3 with the rod 1 is released in this manner, the sleeves 2 and 3 become movable on the rod 1.

In the above embodiment, although the restraint portion is constituted by two pairs of sleeves and rams, three or more pairs of sleeves and rams may be used in accordance with a necessary friction force.

The oil for supplying pressure to the oil chambers 6 and 7 may be replaced by any other medium.

Figure 2:
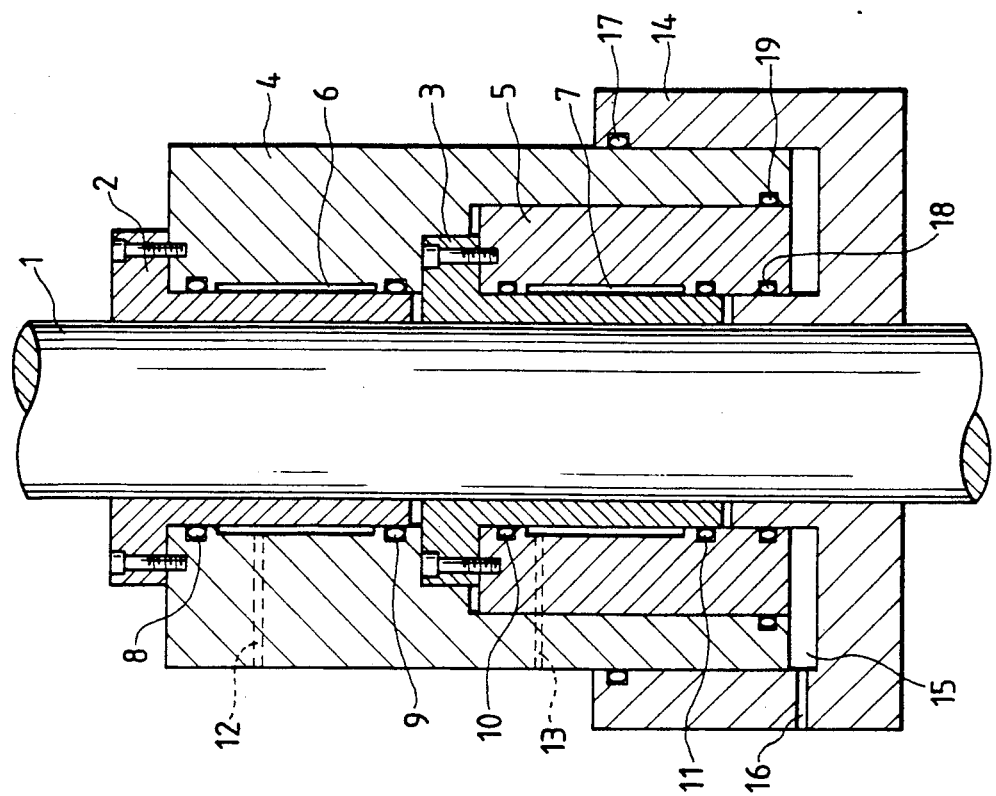
FIG. 2 is a sectional view illustrating a main part of another embodiment of the friction clamping apparatus according to the present invention.

FIG. 2 shows a second embodiment according to the present invention. In this embodiment, as shown in FIG. 2, a ram 5 is fittingly inserted into a ram 4. The combination portion of the rams 4 and 5 is sealed by a seal member 19. In this restraint portion, a rod 1 of the friction clamping portion is fittingly inserted through a housing 14 so as to form an oil chamber 15 defined by the rams 4 and 5 of the friction clamping portion and the housing 14. In the oil chamber 15, the combination portion of the housing 14 and the rams 4 and 5 is sealed by seal members 17 and 18 respectively. Oil pressure can be supplied to or released from the oil chamber 15 through an oil path 16. The other parts are arranged in the same manner as those in the first embodiment.

Next the operation of the second embodiment will be described. In this embodiment, in the state of restraint of the sleeves 2 and 3 with the rod 1, if oil pressure is supplied, through the oil path 16, into the oil chamber defined by the respective lower end portions of the rams 4 and 5 of the friction clamping portion and the housing 14, the housing 14 is urged to move downwards in the drawing of FIG. 2, so that it is possible to produce a restraint force. The reaction force thereof acts onto the sleeves 2 and 3 through the rams 4 and 5, but the pressure receiving areas of the rams 4 and 5 are shared equally or suitably, so that equally or suitably shared reaction force acts onto the sleeves 2 and 3. The other operation is the same as that in the first embodiment.

In the same manner as in the first embodiment, if necessary, three or more pairs of sleeves and rams may be serially combined. The pressured oil supplied to the oil chambers 6 and 7 may be replaced by any other medium. Although the sleeve 2 and the ram 4 and the sleeve 2 and the ram 5 are connected with each other separately by bolts, they may be connected with each other by means of a single bolt.

Next, a third embodiment of the present invention will be described with reference to FIG. 3.

As shown in FIG. 3, three clamping units 38a, 38b and 38c having an arrangement which will be described later and having different lengths are mounted on a shaft 39 in the order of increasing length from the illustrated upper portion.

The configuration of each of the clamping units 38a, 38b and 38c will be described.

Elastically transformable sleeves 31a, 31b and 31c having collar portions 32a, 32b and 32c respectively are fittingly inserted into outer cylinders 33a, 33b and 33c air-tightly so as to make the collar portions 32a, 32b and 32c engage with one-side ends of the outer cylinders 33a, 33b and 33c respectively, so that restraint pressure chambers 34a, 34b and 34c are formed by concave portions respectively formed in the inner circumferential surfaces of the respective outer cylinders 33a, 33b and 33c and the outer circumferential surfaces of the respective sleeves 31a, 31b and 31c respectively. The restraint pressure chambers 34a, 34b and 34c are provided with leading holes 35a, 35b and 35c respectively so that a pressurized fluid can be supplied into the restraint pressure chambers 34a, 34b and 34c from a not shown pressed-fluid producing source through the respective leading holes 35a, 35b and 35c. The reference numeral 36 represents a seal constituted by an O-ring, or the like, for maintaining air-tightness so as to prevent the pressurized fluid from leaking out of the restraint pressure chambers 34a, 34b and 34c.

A hole 37a is formed in the end surface of the outer cylinder 33a which contacts with the clamping unit 38b illustrated in the center and which belongs to the short clamping unit 38a illustrated in the uppermost position in the drawing and positioned oppositely to the collar portion 32b of the sleeve 31b of the center clamping unit 38b, and the collar portion 32b of the sleeve 31b of the center clamping unit 38b is fittingly inserted into the hole 37a so as to provide a space between the end surface of the collar portion 32b and the bottom surface of the hole 37a. In the same manner, a hole 37b is formed in the end surface of the outer cylinder 33b which contacts with the long clamping unit 38c illustrated in the lowermost position in the drawing and which belongs to the center clamping unit 38b opposite to the collar portion 32c of the sleeve 31c of the lower clamping unit 38c, and the collar portion 32c of the sleeve 31c of the lower clamping unit 38c is fittingly inserted into the hole 37b so as to provide a space between the end surface of the collar portion 32c and the bottom surface of the hole 37b.

The above-mentioned spaces are for the purpose to absorb the transformation of the respective clamping units 38a, 38b and 38c caused by giving the clamping units 38a, 38b and 38c reaction force indicated by the arrow f against a force indicated by the arrow F which is given to the shaft 39 at the time of restraint as shown in FIG. 3. That is, by the above-mentioned reaction p force f, the sleeves 31a, 31b and 31c are expanded in the same direction as the force of the arrow F, while the outer cylinders 33a, 33b and 33c are compressed and shrunk in the axial direction.

Describing more in detail, since the sleeve 31a of the upper clamping unit 38a is expanded and the outer cylinder 33a is shrunk, indeed the counter-collar-portion-side top end portion of the sleeve 31a projects over the hole 37a toward the illustrated lower, but as mentioned above, because of providing a space between the top end surface of the collar portion 32b of the sleeve 31b of the center clamping unit 38b and the hole 37a, the expansion of the sleeve 31a and the shrinkage of the outer cylinder 33a are absorbed. In the same manner, the transformation of the center clamping unit 38b, that is, the expansion of the sleeve 31b of the center clamping unit 38b and the shrinkage of the outer cylinder 33b are absorbed by a space between the end surface of the collar portion 32c of the sleeve 31c of the lower clamping unit 38c and the bottom surface of the hole 37b.

Next, the operation of this embodiment will be described.

In order to restrain each of the clamping units 38a, 38b and 38c, that is, in order to restrain each of the sleeves 31a, 31b and 31c with the shaft 39, a pressurized fluid is supplied to the restraint pressure chambers 34a, 34b and 34c through the leading holes 35a, 35b and 35c respectively at the same time. By the pressure of the pressurized fluid supplied to the respective restraint pressure chambers 34a, 34b and 34c, the sleeves 31a, 31b and 31c are shrunk in the radial direction and pressed against the shaft 39 to thereby generate friction forces between the outer circumferential surface of the shaft 39 and the inner circumferential surfaces of the sleeves 31a, 31b and 31c respectively, so that the sleeves 31a, 31b and 31c are restrained so as to be integrated with the shaft 39. The sleeves 31a, 31b and 31c and the respective outer cylinder 33a, 33b and 33c are, as mentioned above, restricted in the axial direction by their collar portions 32a, 32b and 32c and the end surfaces of the respective cylinders 33a, 33b and 33c, so that the outer cylinders 33a, 33b and 33c are integrated with the shaft 39 through the respective sleeves 31a, 31b and 31c.

At the time of the above-mentioned restraint, assume that the quantities of expansion of the respective sleeves 31a, 31b and 31c, at the time of giving the force of the arrow F to the shaft 39, are S1, S2 and S3, and the quantities of shrinkage of the respective outer cylinders 33a, 33b and 33c are r1, r2 and r3. In order to make description simple, assume that the shaft 39 is a perfect rigid body. Assuming that the friction forces produced on the respective clamping units 38a, 38b and 38c are f1, f2, f3, then the total friction force fs is expressed by:

$$fs = f1 + f2 + f3 \quad (1)$$

Then, the quantity of expansion S1 of the upper sleeve 31a and the quantity of shrinkage r1 of its outer cylinder 33a are caused by the friction force f1 of the upper clamping unit 38a, and in the same manner, S2 and r2 are caused by the friction force f2 of the center clamping unit 38b, and S3 and r3 are caused by the friction force f3 of the lower clamping unit 38c.

Therefore, if the lengths of the respective sleeves 31a, 31b and 31c of the respective clamping units 38a, 38b and 38c and their outer cylinders 33a, 33b and 33c are established so that $(S3-r2)=S2$ and $(S2-r1)=S1$, the reaction force against the force of the arrow F given to the shaft 39 can be dispersed to the clamping units 38a, 38b and 38c.

In the above-mentioned embodiment, although three clamping units are provided, the number of clamping units may be two or not less than four. In addition, the order of overlaying clamping units is not limited in the above-mentioned embodiment, the order of overlaying may be reversed, or may be set desiredly.

Since the present invention has such configurations as described above, it is possible to obtain the following effects.

That is, by combining a plurality of sleeves and rams as shown in the first and second embodiment, it is possible to make individual parts compact so that it is easy to process and assemble the parts, and if a large friction force is necessary, it is possible to use the apparatus without limitation by increasing the number of combined pairs.

In addition, in the case where a plurality of pairs of sleeves and rams are combined, by controlling oil pressure given to spaces formed by the respective sleeves and rams separately, in combination with the former effect, it is possible to give a number of degrees of freedom to a friction force in a wide range from a small friction force to a large friction force.

In addition, as shown in the third embodiment, since a load in the axial direction is dispersed to a plurality of sleeves, it is possible to make the thickness of sleeves thinner than conventional ones, so that it is possible to establish the pressure of a pressurized fluid required for shrinking the sleeves in the diameter direction to a low value. In addition, in the case of establishing the pressure to the same as conventional one, contact pressure per unit area of the sleeve inner circumferential surface with the rod outer circumferential surface becomes large, so that it is possible to obtain a large friction force in a comparatively small contact area and it is possible to make the apparatus small in size.

In addition, in the case of producing a large friction clamping apparatus, since the lengths of individual sleeves and outer cylinders are comparatively short, it is possible to improve the processing accuracy, and it is possible to reduce the processing cost.

What is claimed is:

1. A friction clamping apparatus adapted for use with a rod, comprising:
a plurality of friction clamping units serially connected in the axial direction of said rod, each of said friction clamping units including a radially elastically transformable sleeve and a ram into which said sleeve is fittingly inserted, said rod being fittingly inserted through the respective sleeves of said friction clamping units, wherein a ram of a first friction clamping unit of said plurality of friction clamping units is connected to a ram of a second friction clamping unit of said plurality of friction clamping units;

a plurality of restraint pressure chambers defined by inner circumferential surfaces of respective rams of said plurality of friction clamping units and outer circumferential surfaces of respective sleeves of said plurality of friction clamping units, so that either a fluid pressure is made to act upon said restraint pressure chambers of said plurality of friction clamping units to restrain said rod with said sleeves or the fluid pressure is made so as not to act upon said restraint pressure chambers of said plurality of fiction clamping units to release said rod from said sleeves;

a restraint portion including a housing into which said rod and said ram of the outermost-end one of said plurality of friction clamping units are fitted; and a clamping fluid pressure chamber formed between said housing and a lower portion of said ram of said outermost-end friction clamping unit, so that a fluid pressure is made to act upon said clamping fluid pressure chamber to generate a clamping force.

2. A friction clamping apparatus adapted for use with a rod, comprising:

a plurality of friction clamping units serially connected in the axial direction of said rod, each of said friction clamping units including a radially elastically transformable sleeve and a ram into which said sleeve is fittingly inserted, said rod being fittingly inserted through the respective sleeves of said friction clamping units;

a plurality of restraint pressure chambers defined by inner circumferential surfaces of respective rams of said plurality of friction clamping units and outer circumferential surfaces of respective sleeves of said plurality of friction clamping units, respectively, so that a fluid pressure is made to act upon the restraint pressure chambers of said plurality of friction clamping units to restrain said rod with said sleeves or the fluid pressure is made so as not to act upon said restraint pressure chambers of said plurality of friction clamping units to release said rod from said sleeves; and a restraint portion, said restraint portion including a housing into which said rod and said ram of the outermost-end one of said plurality of friction clamping units are fitted, and a clamping fluid pressure chamber formed between said housing and a lower portion of said ram of said outermost-end friction clamping unit, so that a fluid pressure is made to act upon said clamping fluid pressure chamber to generate a clamping force, wherein the ram of one of said friction clamping units is fittingly inserted into the ram of a second adjacent one of said plurality of friction clamping units so as to form a set of rams, said rams in sets being connected in series.

3. A friction clamping apparatus according to claim 2, wherein said fluid is oil.

4. A friction clamping apparatus adapted for use with a rod, comprising:

a friction clamping portion including a plurality of sleeves in a series arrangement, a plurality of rams in a series arrangement, one of said rams being fittingly inserted into an adjacent one of said rams so that said rams are connected in series one by one, said rod being fittingly inserted through said series of sleeves, said series of sleeves being fittingly inserted into said series of rams respectively to form fluid chambers between said sleeve and said rams respectively so that a fluid pressure is made to act upon said fluid chambers to thereby restrain said rod and said sleeves with each other; and a clamping portion including a housing, said rod being fittingly inserted through said housing, the outermost one of said rams being fittingly inserted into said housing to form a fluid clamping chamber so that a fluid pressure is made to act upon said fluid clamping chamber to thereby generate a clamping force.

5. A friction clamping apparatus according to claim 4, wherein said fluid is oil.

* * * * *